Figure 1:
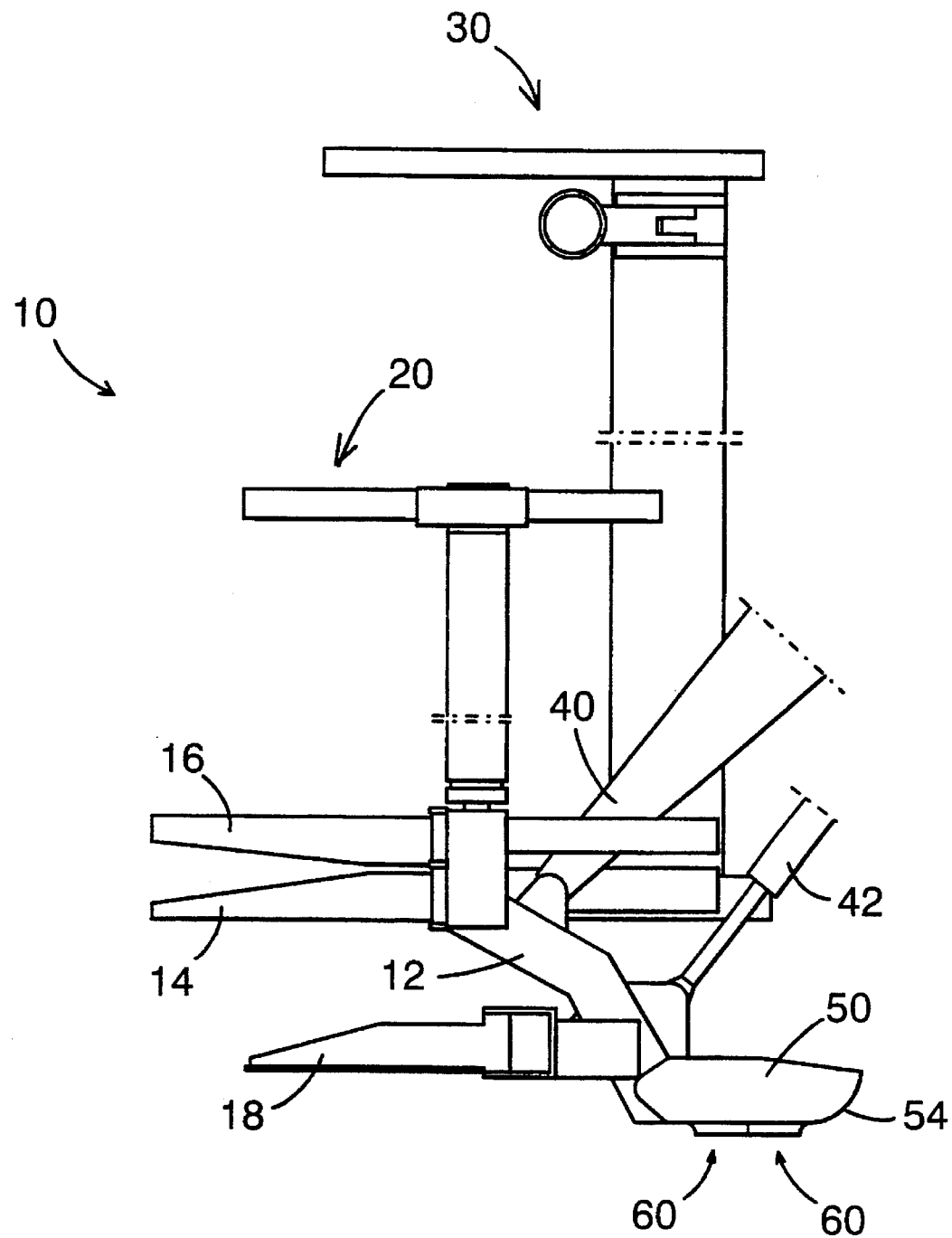

United States Patent [19]
Widegren

[11] Patent Number: 5,479,731
[45] Date of Patent: Jan. 2, 1996

[54] TREE HARVESTING APPARATUS

[76] Inventor: Lars Widegren, Arentgrapegatan 31, S-981 32 Kiruna, Sweden

[21] Appl. No.: 204,257
[22] PCT Filed: Sep. 2, 1992
[86] PCT No.: PCT/SE92/00604
  § 371 Date: Jun. 14, 1994
  § 102(e) Date: Jun. 14, 1994
[87] PCT Pub. No.: WO93/04575
  PCT Pub. Date: Mar. 18, 1993

[30] Foreign Application Priority Data

Sep. 9, 1991 [SE] Sweden .................................. 9102616

[51] Int. Cl.⁶ ...................................................... A01G 23/06
[52] U.S. Cl. .............................. 37/302; 254/132; 172/438
[58] Field of Search ..................... 37/195, 302; 56/DIG. 8, 56/12.8, 328.1, 330; 111/101, 104; 171/61; 172/439, 438, 698; 295/132

[56] References Cited

U.S. PATENT DOCUMENTS

| | | | |
|---|---|---|---|
| 2,535,054 | 12/1950 | Ernst et al. | 254/132 |
| 2,663,952 | 12/1953 | Winget | 37/302 |
| 2,766,535 | 10/1956 | Ralston | 37/302 |
| 2,885,799 | 5/1959 | Tourneau | 37/302 |
| 3,802,663 | 4/1974 | Widegren et al. | 37/302 X |
| 4,244,560 | 1/1981 | Hawkins | 254/132 |
| 4,353,424 | 10/1982 | Schneck et al. | 172/438 |
| 5,054,744 | 10/1991 | Essex | 254/132 X |
| 5,079,864 | 1/1992 | Roy | 37/302 |

FOREIGN PATENT DOCUMENTS

| | | |
|---|---|---|
| 1134238 | 8/1962 | Germany . |
| 142017 | 8/1949 | Sweden . |
| 327856 | 8/1970 | Sweden . |
| 1005692 | 4/1980 | U.S.S.R. . |
| 728787 | 4/1980 | U.S.S.R. . |

*Primary Examiner*—Terry Lee Melius
*Assistant Examiner*—Robert Pezzuto
*Attorney, Agent, or Firm*—Michael, Best & Friedrich

[57] ABSTRACT

A tree harvester which is intended to be fitted to a crane arm or the like for the purpose of uprooting trees. In order to supplement the ground preparation that is automatically achieved adjacent the exposed soils areas left in the ground subsequent to pulling out a tree by its roots, it is proposed in accordance with the invention, among other things, that the tree harvester is provided with a soil scraping or cultivating unit intended to be brought into engagement with and moved along the ground so as to prepare the ground for forest regeneration.

11 Claims, 2 Drawing Sheets

TREE HARVESTING APPARATUS

The present invention relates to a tree harvester which is intended to be fitted to a crane jib or the like for the purpose of uprooting trees.

Several advantages are afforded when forests are logged with the air of a forest harvester (see for instance SE-C-327 856). One advantage is that when trees are pulled up with their roots attached, i.e. uprooted, the ground is prepared automatically for the plantation of young trees, which can be planted directly in the exposed soil, without requiring further measures to be taken.

When planting new trees, however, it is often necessary to scarify or cultivate patches of ground between the uprooted trees when this is necessary because of the distances between the uprooted trees. To this end, there may be used a scarifier or cultivator in the form of pivotal diggers or buckets fitted to the arms and jibs of cranes. This separate scarification or cultivation of the ground, however, is encumbered with additional costs for the work carried out and the machine equipment used.

One object of the present invention is to enable such complementary scarification or preparation of the ground to be effected in conjunction with the work of uprooting trees, such as to enable the machine operator to create fresh scarified patches between separate individual uprooting operations, without needing to change machine equipment to this end.

This is achieved with a tree harvester of the aforedescribed kind which has the characteristic features set forth in the following claims.

Because, in accordance with one preferred embodiment of the invention, the ground-support of the tree harvester is constructed, preferably on its underside, with an earth scraping or deep cultivator unit which scarifies or prepares the ground for planting as the ground-support is moved along the ground, the operator may permit the ground-support to slide along the ground at a selected position thereon as the tree harvester is moved to the nest tree to be uprooted, so that a planting area or possibly two planting areas is/are prepared with the aid of the scraper or deep cultivator.

When the scraper or deep cultivator unit is constructed in the form of at least one essentially V-shaped implement, or plough, a ditch of desired length can be produced during the ground scarifying work and one or more plants planted on the raised banks of the ditch.

When, in accordance with a further embodiment of the invention, the upper parts of the blades or sides of the cultivator are curved or angled downwardly therefrom, the, layer of soil exposed along the sides of the ditch can be compacted in a manner favourable for tree planting purposes.

According to one advantageous further development of the invention, the scraper or cultivator unit may be brought into active engagement with the ground by moving the ground-support angularly from a tree uprooting position to a ground scarifying position.

Figure 2:
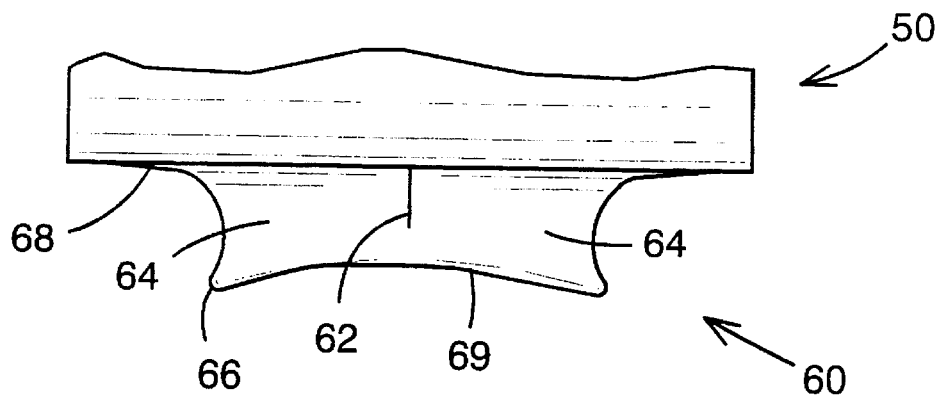
Figure 3:
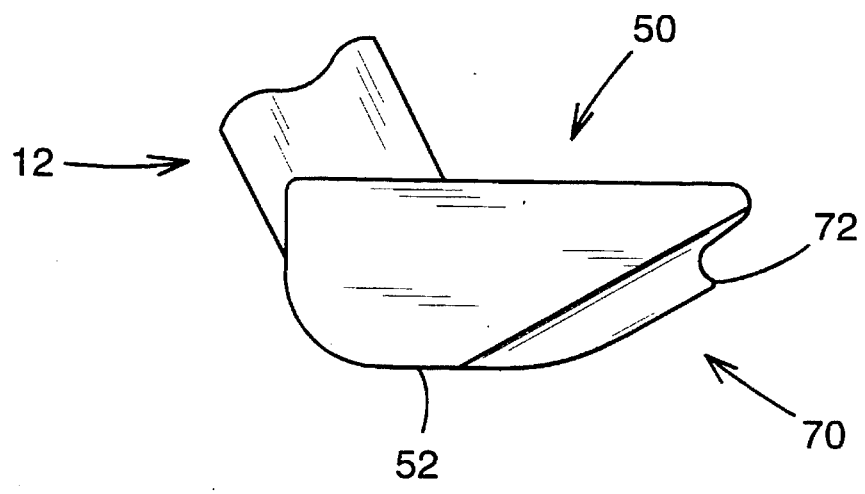

Further features of the invention and advantages afforded thereby will be apparent from the following description of exemplifying embodiments made with reference to the accompanying drawings, in which FIG. 1 illustrates, in side view, a tree harvester equipped with a deep cultivator unit constructed in accordance with the invention;

FIG. 2 is a front view which shows a deep cultivator fitted to the tree harvester, in larger scale; and FIG. 3 is a side view of a ground-support provided with an alternatively arranged deep cultivator unit.

The tree harvester 10 is illustrated in FIG. 1 comprises a frame structure 12 which carries, among other things, a pair of gripping arms 14, 16 which are intended to be placed around the tree to be harvested, and a cutting device 18 by means of which the root is separated from the tree.

The frame structure 12 of the illustrated tree harvester 10 is connected to a holding device 20 and a device 30 which functions to firmly hold and store trees adjacent the tree harvester, said devices 20 and 30 being connected to the frame structure 12 by means of respective columns. These latter described features of the tree harvester 10 do not constitute any part of the invention and will therefore not be described in detail here. The reader is referred to SE-B-461 824 for a more detailed description of this tree harvester construction.

The tree harvester 10 is pivotally connected via the frame structure 12, to the end of a crane arm 40 of an off-road vehicle and also to a hydraulic piston-cylinder device 42 by means of which the tree harvester 10 is brought to desired positions in the vertical plane of the crane arm 40.

The lower end of the frame structure 12 is constructed as a ground-support 50. The ground-support 50 functions as a counterpressure device against the ground when a tree is uprooted, by gripping the trunk of the tree with the gripping arms 14, 16 and subsequently changing the attitude or angular position of the tree, while using the leverage afforded by the lever arm formed by engagement of the ground-support 50 with the ground, until the roots of the tree give and the tree, together with its roots, can be lifted from the ground.

As earlier indicated, a young tree, or sapling, can be planted in the hollow that is left in the ground as the roots of a tree are lifted therefrom, more specifically in the mound of soil created adjacent the tree as the tree is moved from side to side or backwards and forwards in conjunction with uprooting the tree. If this self-scarification or self-preparation of the ground achieved when uprooting a tree prior to forest regeneration needs to be complemented with freshly scarified or cultivated patches, because the distances between the harvested trees is too great to be beneficial to the young plants, a separate scarifying unit is fitted to the tree harvester, in accordance with the invention.

In the case of the FIG. 1 embodiment, the underside of the ground-support 50 has formed integrally therewith a ground scarifying unit in the form of two essentially V-shaped deep-cultivators or deep-cultivator elements 60, 60 which extend opposite to the vertical plane. The cultivators 60, 60 function to create elongated scarified patches or ditches as a result of moving the ground-support 50 resting on the ground, by means of the crane arm 40 or the vehicle on which the crane arm is mounted.

FIG. 2 is a front view of the rear cultivator 60 shown to the right in FIG. 1. Because, in the illustrated case, the position of the cultivator 60 necessitates constructing the cultivator to withstand the considerable ground abutment forces to which it is subjected when uprooting a tree, the front/bottom part of the cultivator 60 is appropriately rounded instead of having a sharp point. On the other hand, there is provided on the upper front part of the cultivator a cutting edge 62 which may extend upwardly to an extent corresponding roughly to half the vertical extension of the cultivator 60. Since, when uprooting a tree, the two sides 64, 64 of the cultivator 60 are not subjected to the same high pressure forces as the lower forward edge of the cultivator, the bottom regions of the two arms 64, 64 may have the configuration of undercutting wings, or at least have the resemblance of such wings, as indicated at 66 in FIG. 2, so as to contribute towards breaking up soil ridges. The upper part 68 of each cultivator side 64 is curved outwards in the manner of a conventional plough share so as to slightly flatten the upturned soil, or to turn over the soil to a greater or lesser extent. As will be seen from FIG. 2, the underside of the cultivator 60 and the ground-support 50 respectively may advantageously be contoured, 69, such that the resulting ditch will have a bottom of convex cross-section. With a ditch of this cross-section, rain and water that derives from melted snow will be concentrated to the sides of the ditch, where it is able to reach the young tree planted in the mounds of overturned soil along the sides of the ditch, by capillary action.

FIG. 3 illustrates another embodiment of a cultivator unit constructed in accordance with the invention. In this case, the cultivator 70 is a single-acting cultivator and has essentially the same configuration as the cultivator described in the aforegoing, with the exception that the cultivator of this embodiment is angled away from the underside 52 of the ground-support 50 in the starting position of the tree harvester, prior to uprooting a tree. As with the earlier cultivator, the cultivator 70 of this embodiment is integrated with or formed integrally with the ground-support 50. However, although not shown, the cultivator may equally as well be fitted as a separate part to an oblique or curved surface 54 (FIG. 1) on the ground-support 50. Consequently, because of the manner in which the cultivator is constructed, the cultivator 70 cannot be brought into engagement with the ground until the tree harvester 10 and the ground-support 50 have been brought to an appropriate angular position. The advantage afforded hereby is that the cultivator 70 need not be dimensioned, with regard to mechanical strength, to take-up the load exerted from the ground during a tree-uprooting operation. The front edge of the cultivator may also be given a more pronounced pointed configuration 72, so that the cultivator is able to break-up the soil and subsequently turn the ploughed ridges more easily.

I claim:

1. A tree harvester which is adapted to be fitted to a crane arm for the purpose of uprooting trees, said tree harvester comprising:

a frame mountable on the crane arm;

first means which is supported by said frame and which is selectively engageable with a tree for uprooting the tree from the ground; and second means which is supported by said frame and which is selectively engageable with and movable along the ground so as to scrape or cultivate the ground for forest regeneration, and wherein said second means includes a ground support unit which is adapted to engage the ground and facilitate uprooting of the tree by supporting said tree harvester against the ground.

2. A tree harvester according to claim 1, wherein said second means has the form of at least one generally V-shaped deep cultivator.

3. A tree harvester according to claim 2, wherein said second means includes a pair of sides, and each of said sides includes a lower region and an upper region which extends outwardly from said lower region.

4. A tree harvester according to claim 1, wherein said second means is adapted to be placed in active engagement with the ground by moving said tree harvester angularly from a tree-uprooting position to a ground scarifying position.

5. A tree harvester which is adapted to be fitted to a crane arm for the purpose of uprooting trees, said tree harvester comprising:

a frame mountable on the crane arm;

a tree holding device which is supported by said frame and which is selectively engageable with a tree for uprooting the tree from the ground; and a scraping or cultivating unit which is supported by said frame and which is selectively engageable with the ground to prepare the ground for forest regeneration, wherein one of said frame and said scraping unit includes a ground-support unit which is adapted to engage the ground and facilitate uprooting of the tree by supporting said tree harvester against the ground.

6. A tree harvester according to claim 5, wherein said scraping or cultivating unit has the form of at least one generally V-shaped deep cultivator.

7. A tree harvester according to claim 6, wherein said scraping or cultivating unit includes a pair of sides, and each of said sides includes a lower region and an upper region which extends outwardly from said lower region.

8. A tree harvester according to claim 5, wherein said scraping or cultivating unit is adapted to be placed in active engagement with the ground by moving said tree harvester angularly from a tree-uprooting position to a ground scarifying position.

9. A method for harvesting trees with a tree harvester mounted on a crane arm , the tree harvester including a frame, first means which is supported by the frame for selective engagement with a tree for uprooting the tree from the ground, and second means which is supported by the frame for selective engagement with the ground to scrape or cultivate the ground for forest regeneration and wherein said second means includes a ground support unit which is adapted to engage the ground and facilitate uprooting of the tree by supporting said tree harvester against the ground, said method comprising the steps of:

(a) moving the tree harvester to a tree harvesting position relative to the ground, (b) engaging a tree with the first means, (c) operating the tree harvester so that the first means uproots the tree, (d) bringing the second means into engagement with the ground, and (e) operating the tree harvester so that the second means scrapes or cultivates the ground for forest regeneration.

10. A method according to claim 9, wherein the second means is a scraping or cultivating unit which is selectively engageable with and movable along the ground to scarify the ground.

11. A method according to claim 9, wherein one of the frame and the scraping or cultivating unit includes a ground-support unit which is adapted to engage the ground and thereby support the tree harvester against the ground for uprooting the tree.

* * * * *